United States Patent [19]

Jarnestedt et al.

[11] Patent Number: 4,639,935

[45] Date of Patent: Jan. 27, 1987

[54] APPARATUS FOR CORRECTING FREQUENCY-DEPENDENT ATTENUATION OF THE TRANSMITTING MEDIUM IN SIGNAL TRANSMISSION

[75] Inventors: Göran Jarnestedt, Johanneshov; Rolf von Campenhausen, Lidingö, both of Sweden

[73] Assignee: Telefonaktiebolaget LM Ericsson, Stockholm, Sweden

[21] Appl. No.: 749,533

[22] PCT Filed: Oct. 31, 1984

[86] PCT No.: PCT/SE84/00368

§ 371 Date: Jun. 19, 1985

§ 102(e) Date: Jun. 19, 1985

[87] PCT Pub. No.: WO85/02509

PCT Pub. Date: Jun. 6, 1985

[30] Foreign Application Priority Data

Dec. 2, 1983 [SE] Sweden .................. 8306671

[51] Int. Cl.⁴ .......................... H04L 27/28
[52] U.S. Cl. .......................... 375/11; 375/89; 370/120
[58] Field of Search .......... 375/11, 12, 14, 80, 375/88, 89, 90, 96; 370/69.1, 120; 455/615; 329/104; 340/825.58; 333/18

[56] References Cited

U.S. PATENT DOCUMENTS

| | | | |
|---|---|---|---|
| 2,855,506 | 10/1958 | Schabauer | 375/89 |
| 3,205,442 | 9/1965 | Stamboulis | 375/12 |
| 3,810,019 | 5/1974 | Miller | 375/89 |
| 3,820,042 | 6/1974 | Mueller | 375/14 |
| 4,298,983 | 11/1981 | Kawai et al. | 375/12 |
| 4,409,593 | 11/1983 | Bose | 375/96 |
| 4,528,674 | 7/1985 | Sweeney et al. | 375/96 |

OTHER PUBLICATIONS

Nippon Denk K. K., "Patent Abstract of Japan", vol. 7, NR. 13E153, abstract of Japan-57-170656, Oct. 20, 1982.

Powell, K. E., "FSK Demodulator Circuit", IBM Technical Disclosure Bulletin, vol. 21, Jun. 1978, No. 1, pp. 339–340.

*Primary Examiner*—Robert L. Griffin
*Assistant Examiner*—Stephen Chin
*Attorney, Agent, or Firm*—Roberts, Spiecens & Cohen

[57] ABSTRACT

Digital signals which are sent each with their own frequency are corrected for frequency-dependent attenuation of the transmitting medium in a filter (5) so as to maintain a desired relationship between the amplitudes of the signals after the filter. Difference circuits (6) which have output signals (US1, US2, US3) control the filter means, obtain signals (Uf0) on their first inputs from a common voltage supply circuit (9) and signals (Uf1, Uf2, Uf3) on their second inputs from a voltage supply circuit (10) for each of the output signals. A decoder (18) sends a control signal (S0, S1, S2, S3) associated with the respective digital signal. The control signals reset switches (17) whereby the voltage supply circuits (9, 10) obtain signals from an amplitude detector (13) corresponding to the respective frequency in the transmitted signal. Each of the output signals (US1, US2, US3) fed to the filter (5) by the difference circuits (6) thus corresponds to a digital signal.

3 Claims, 6 Drawing Figures

APPARATUS FOR CORRECTING FREQUENCY-DEPENDENT ATTENUATION OF THE TRANSMITTING MEDIUM IN SIGNAL TRANSMISSION

TECHNICAL FIELD

The present invention relates to an apparatus in a transmitter of digital signals, each sent with its own frequency, for correcting frequency-dependent attenuation in the transmitting medium, and more particularly to such apparatus including a filter means where at least one of the frequencies can be attenuated for retaining a desired relationship between the amplitudes of the signals associated with different frequencies.

BACKGROUND ART

Frequency-dependent attenuation of a transmitting medium can be corrected by a filter with an adjustable frequency characteristic. In adjusting such a filter there is required knowledge of the attenuation properties of the channel in question and a new adjustment is required for alterations in the channel, e.g. alterations due to re-disposition of the cable etc. Should there be an alteration in the channel, there is an obvious risk that the filter adjustment is forgotten or that an adjustment is incorrect. To avoid these difficulties, filters are used with a variable frequency characteristic, which can be controlled in cable transmission by a DC current applied to the line, the strength of the current being dependent on the length of the line. Since the channel signal attenuation is not unambigously related to the strength of the DC current, compensation will be incomplete, resulting in that a transmitted signal can be wrongly detected.

DISCLOSURE OF INVENTION

The above problems are solved in accordance with the invention by the received signal voltage being detected and the amplitude differences between signals associated with different frequencies being used to control the filter attenuation. The invention is characterized by the disclosures of the accompanying claims.

BRIEF DESCRIPTION OF DRAWINGS

The invention will now be described in detail in connection with the appended drawing where.

BEST MODE FOR CARRYING OUT THE INVENTION

Figure 1A:
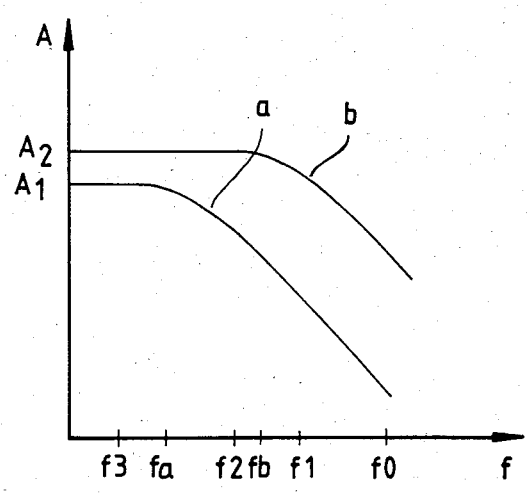
FIG. 1a is a diagram of the frequency-dependent attenuation in two different transmission cables.
Figure 1B:
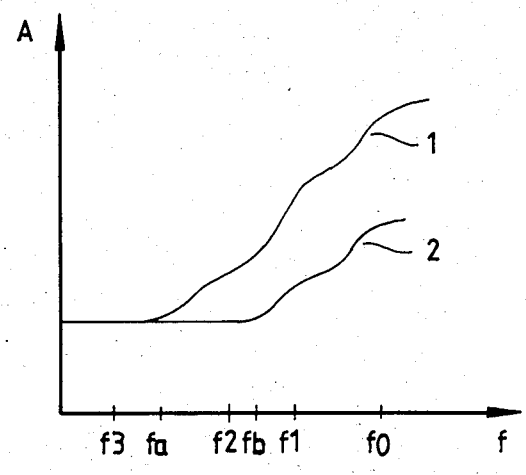
FIG. 1b is a diagram of the frequency characteristic of a compensation filter.

FIG. 1a illustrates how signals are attenuated in transmission in two separate cables with different lengths corresponding to graphs a and b in the diagram, in which A is the signal amplitude level and f its frequency. For low frequencies, the cables attenutate the amplitude to the respective given levels A1 and A2, and for increasing frequency the attenuation in the longer cable increases at a frequency fa according to the graph a and the attenuation of the shorter cable increases at a frequency fb according to the graph b. FIG. 1b illustrates two characteristics 1 and 2 for a variable filter, which can compensate for the attenuation of the long and the short cable. The transmitted signals have the frequencies f0, f1, f2 and f3 and the filter is conventionally selected so that its attenuation is fixed at the highest of these frequencies, f0, but can be varied for the remaining frequencies. This may be carried out with the aid of control signals which change the filter parameters, e.g. by changing the resistance of a field effect transistor. With full compensation, all the signals beyond the filter up to the highest desired frequency f0 will be attenuated to the same level. Since the characteristic of the filter can be varied for the transmitted frequencies, the filter can completely compensate the received signal in spite of the filter characteristic for intermediate frequencies not completely corresponding to the cable attenuation.

Figure 2:
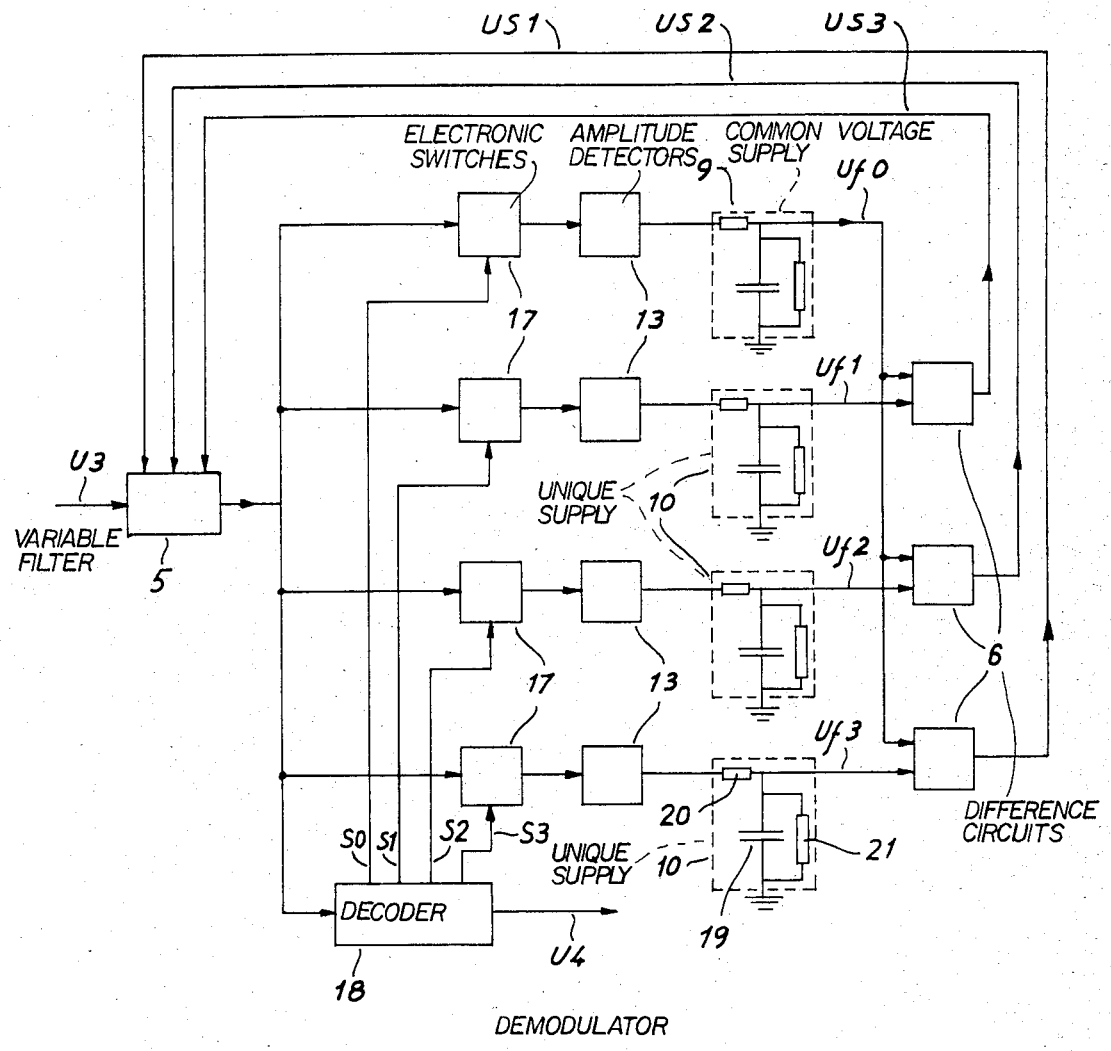
FIG. 2 is a block diagram of a demodulator provided with an apparatus in accordance with the invention for correcting frequency-dependent attenuation in transmitting four different frequencies.
Figure 3:
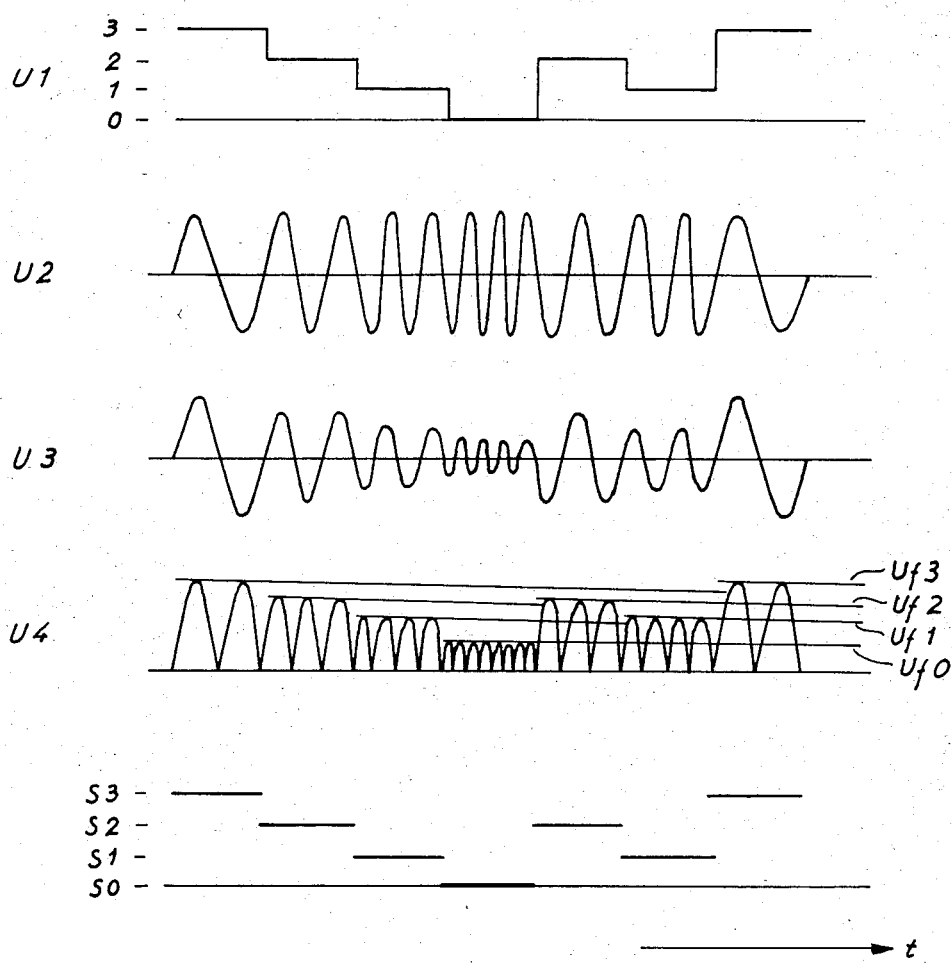
FIG. 3 is a diagram showing the time variation of the signals at different instants in this demodulator.

FIG. 2 is a block diagram of a demodulator provided with a variable filter 5, and which will now be described in connection with the signal diagrams in FIG. 3, where t denotes the time. A digital signal U1 with the values 0, 1, 2 and 3 can be conventionally converted to a signal U2 by frequency shift modulation. The signal is divided into time intervals where each interval contains one of the frequencies f0, f1, f2 or f3 in correspondence to the values 0, 1, 2 and 3 in the digital signal. All the intervals in FIG. 3 are of the same length in the example, although this is not necessary. The modulated signal U2 is attenuated during transmission, as described in connection with FIG. 1a, so that the receiver obtains a signal U3 with varying amplitude. This signal passes the filter 5, the characteristic of which can be varied at the frequencies f1, f2 and f3 as described in connection with FIG. 1b. In accordance with the invention the filter is controlled by outgoing signals US1, US2 and US3 from their respective difference circuits 6. A first input on each difference circuit 6 is connected to a common voltage supply circuit 9 and each circuit 6 is connected via a second input to a voltage supply circuit 10. The voltage supply circuits are each connected to their respective amplitude detectors 13, which are connected to the filter 5 via electronic switches 17. A decoder 18 is also connected to the filter for detecting conventionally the different frequencies in the filtered signal and the time intervals during which the respective frequency is sent. From this the decoder conventionally derives a digital signal U4, corresponding to the signal U1 originally sent. The decoder also derives from the filtered signal the control signals S0, S1, S2 and S3 corresponding to their respective frequencies in the signal U3. The decoder supplies each of the switches 17 with its respective control signal, which resets the switch for the duration of the signal. The amplitude detectors are thus activated for the duration of their respective signals so that each detector obtains a signal corresponding to a frequency. The amplitude detectors which are not illustrated in detail on the drawing, measure the peak values of the signals, e.g. by rectifying the full wave of the signal received by the detector. The amplitude detectors send their peak values via a diode to the voltage supply circuits 9 and 10. The circuit 9, its output signal Uf0 corresponding to the amplitude of the highest frequency f0, sends this signal to the first input of each of the difference circuits 6. The circuits 10, with their output signals Uf1, Uf2 and Uf3 corresponding to each of the remaining frequencies, send these signals to the second input of the respective difference circuit. The difference circuits form the control signals US1, US2 and US3 by forming difference values between their input signals. The filter 5 receives the control signals, which then control the frequency characteristic at the frequencies f1, f2 and f3, according to the description above, so that the amplitude difference in the filtered signal decreases. The frequency-dependent attenuation in the transmission is thus corrected.

The voltage supply circuits 9 and 10 include a capacitor 19 which is charged via a resistor 20 by signals from the respective detector 13. The capacitor is discharged slowly via a resistor 21 during the interval between two charges. For a suitable selection of capacitor and resistors there are obtained differences between the signal Uf0 on one hand and the signals Uf1, Uf2 and Uf3 on the other hand, which follow the decrease of the amplitude differences in the filtered signal.

Figure 4:
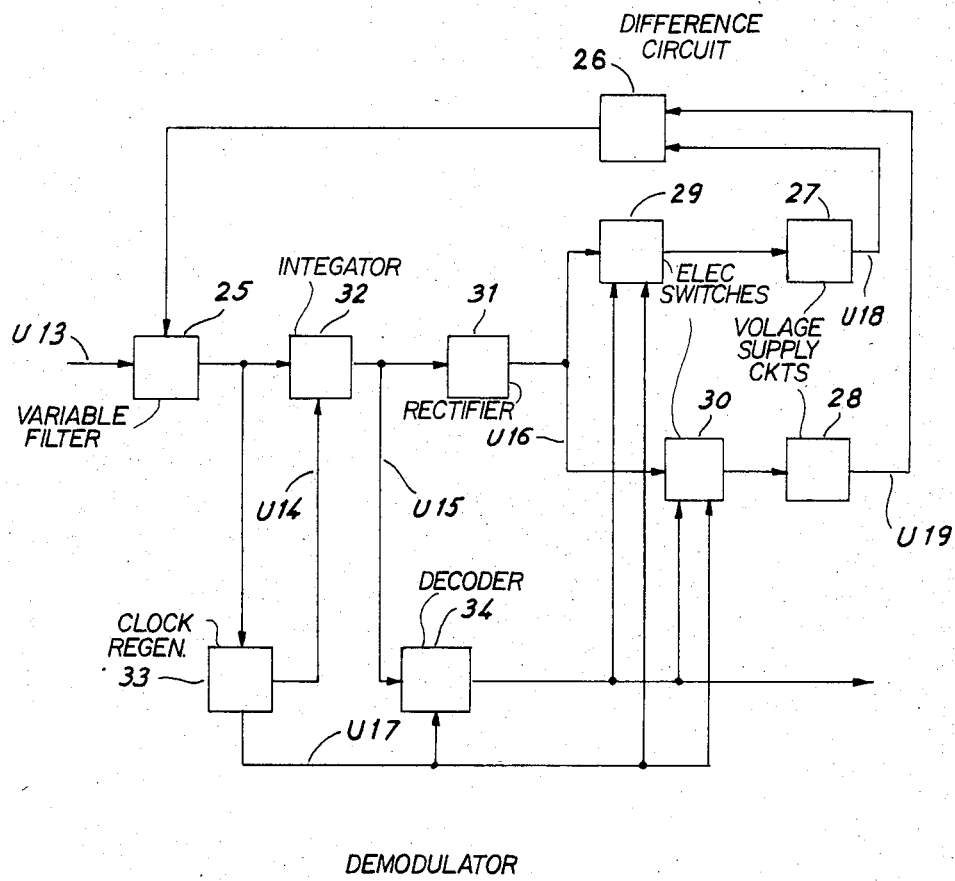
FIG. 4 is a block diagram of a further demodulator for correcting attenuation in transmitting two frequencies and FIG. 5 is a diagram showing the signals in this demodulator.
Figure 5:
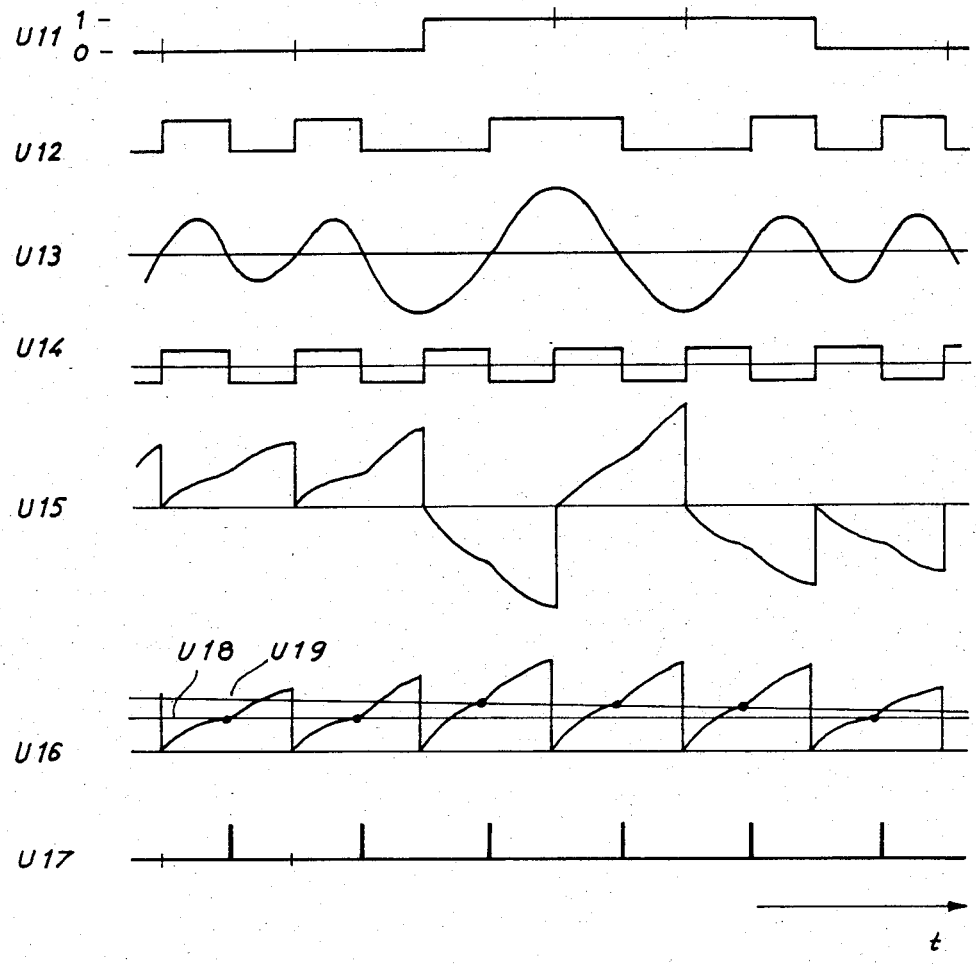

FIG. 4 is a block diagram of a further demodulator provided with a variable filter 25, and which will now be described in connection with the signal diagrams in FIG. 5, where t denotes the time as before. A binary signal U11 with the values 0 and 1, which are to be transmitted to a receiver, may be phase shift modulated conventionally to a signal U12 containing pulse trains of two different frequencies in correspondence to the ones and zeros in the binary signal. In transmission the modulated signal U12 is attenuated as described in connection with FIG. 1a, so that the receiver obtains a signal U13 with varying amplitude, this signal passing the filter 25 which has a variable characteristic. In accordance with the invention the filter is controlled by an output signal from a difference circuit 26, the inputs of which are respectively connected to voltage supply circuits 27 and 28. These are respectively connected to electronic switches 29 and 30 via a rectifier 31 connected to an integrating circuit 32. This receives the filtered signal and a clock signal U14, the latter being derived conventionally from the filtered signal by a clock signal regenerator 33. The integrating circuit sends a signal U15 by integrating the filtered signal with respect to the sign of the clock signal. A decoder 34 controlled by clock pulses U17 from the regenerator senses the signal U15. From this the decoder conventionally derives a binary signal corresponding to the original signal U11 by comparing the sign for two consecutive peaks in the sensed signal U15. The integrating circuit 32 also sends the signal U15 to the rectifier 31, which sends a signal U16 to the switches 29 and 30. These are reset by the clock pulses U17 and the binary signals so that the voltage supply circuit 27 obtains the signal U16 for the duration of the clock pulses, when the binary signal assumes the value 0 and the voltage supply circuit 28 obtains the signal U16 when the binary signal assumes the value 1. The circuit 27 thus obtains an output voltage U18 corresponding to the amplitude of the high frequency part of the filtered signal, and the circuit 28 an output voltage U19 corresponding to the amplitude of the low-frequency part of the same signal. The difference between the voltages U18 and U19 control the filter 25 via the difference circuit 26 so that the amplitude difference for the filtered signal decreases whereby the frequency-dependent attenuation in the transmission is compensated.

The invention has been described in connection with signal transmission in cables, but may also be used for other transmitting media with frequency-dependent attenuation. For information transmitting there are several methods for signal modulation based on conversion of signals with different frequencies, and the invention may be applied in these different methods. Apparatus has been described above where different frequencies of the signals have been attenuated to the same amplitude, but it is also contemplated that the filter may be selected such that a desired relationship between the signal amplitudes of the two frequencies is obtained.

We claim:

1. In a transmission system wherein digital information represented by signals with n-different frequencies is transmitted through a medium which attenuates the signals based on their frequencies, apparatus for correcting the frequency-dependent attenuation of such signals comprising:

a variable filter means, having a signal input for receiving such signals, an output for transmitting controllably attenuated signals and n−1 control inputs for controlling the attenuation of signals received at said signal input by an amount determined by the presence of a control signal at one of said control inputs, common voltage generating means connected to the output means of said variable filter means for generating a common voltage signal which is a function of the amplitude of signals having a first of the n-different frequencies, n−1 other voltage generating means connected to the output means of said variable filter means, each of said n−1 voltage generating means generating a voltage signal which is a function of the amplitude of such signals having one of the n−1 frequencies different from said first frequency, n−1 difference circuit means, each of said difference circuit means having a first input connected to the common voltage generating means to receive the common voltage signal, each of said n−1 difference circuit means having a second input connected to a different one of said n−1 voltage other voltage generating means to receive the voltage signal generating thereby, and each of said n−1 difference circuit means having an output for generating said control signal which is a function of the difference in amplitude between the voltage signals received at the inputs thereof, and means for connecting the respective outputs of said n−1 difference circuit means to respective control inputs of said variable filter means.

2. The apparatus of claim 1 wherein each of said voltage generating means comprises a timed amplitude detector means for detecting the amplitude of the signal from said variable filter means at particular times.

3. The apparatus of claim 2 wherein said timed amplitude detector comprises a signal integrator and a full wave amplifier.

* * * * *